United States Patent Office 2,908,684
Patented Oct. 13, 1959

2,908,684
VAT DYESTUFFS

Tellis A. Martin, Evansville, Ind., and David I. Randall, New Vernon, N.J., assignors to General Aniline & Film Corporation, New York, N.Y., a corporation of Delaware No Drawing. Application August 13, 1956
Serial No. 603,801

10 Claims. (Cl. 260—276)

This invention relates to vat dyes and relates more particularly to new and valuable vat dyestuffs of excellent fastness on materials of vegetable fibers, such as cotton, ranging from red violet to olive brown to bluish grey.

An object of this invention is the provisions of new and valuable vat dyestuffs carrying the diphenyl sulfone bridge.

Another object of this invention is to provide a simple and expeditious process for the preparation of new and valuable vat dyestuffs by condensing disubstituted diphenyl sulfones with two vattable residues.

Other objects of this invention will appear from the following detailed description and claims.

We have found that compounds of the general formula

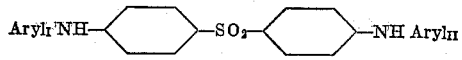

wherein $Aryl_I$ and $Aryl_{II}$ are vattable residues which may be the same or different, are valuable dyestuffs which dye cotton materials in colors of excellent fastness to washing, light and chlorine ranging from red-violet to olive-brown to bluish-grey. For example, $Aryl_I$ and $Aryl_{II}$ may be any of the following vattable residues:

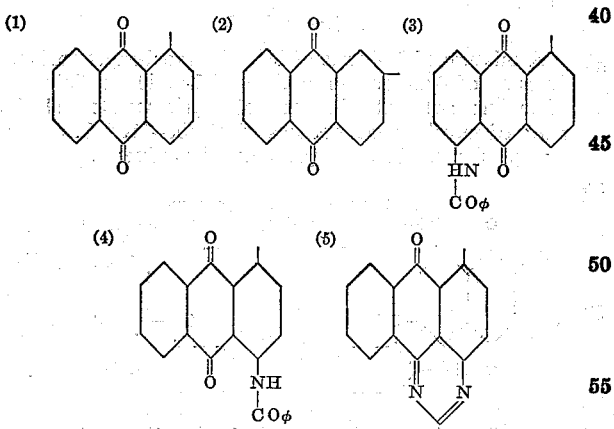

The new vat dyestuffs of this invention may be prepared by condensing a di-substituted diphenyl sulfone with an arylamine as follows:

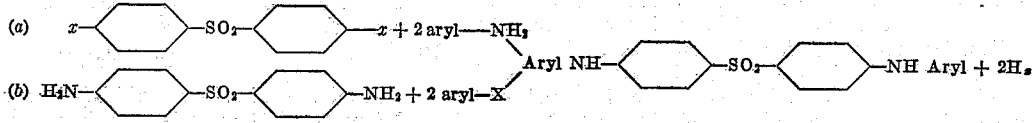

where $x$ may be halogen, chlorine or bromine.

Of these methods the one found to be most satisfactory involved the reaction bis(4-bromophenyl) sulfone and ArNH₂. This method is considered the more desirable for the synthesis of this series of compound. The reaction is carried out in a suitable solvent, i.e., nitrobenzene, naphthalene, biphenyl, etc. at 180–240° C. with an acid acceptor, i.e. sodium carbonate, sodium acetate, etc. and with a catalyst, cupric acetate, cupric chloride, cuprous chloride, etc. The resulting dyestuffs, varying in shades which are determined by the nature of the aryl group(s), possess surprisingly good fastness to chlorine, light and washing. It appears that the sulfonyl group —SO₂— has a desirable effect of imparting good fastness properties to this series of dyestuffs.

We also found that carbazolation of these dyestuffs, i.e.

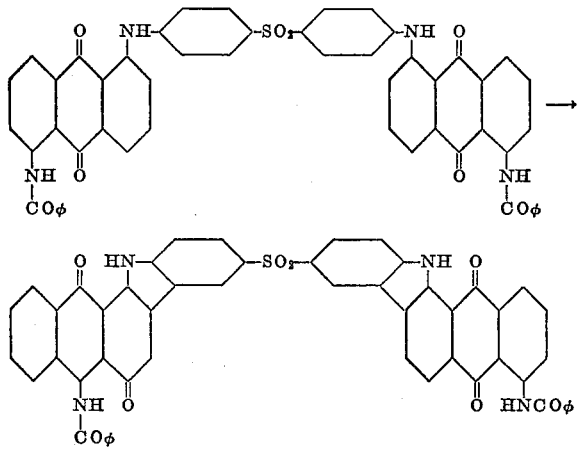

does not occur easily. However, the reaction can be effected under fairly drastic conditions in an AlCl₃—NaCl melt. Here the shades were shifted toward the yellow. The fastness properties of this second class of new dyestuffs were also found to be very good.

The instant invention is further illustrated by the following examples which are not intended to be in any way limitative. The parts are by weight.

*Example I*

A mechanically stirred mixture of 18.8 parts of bis(4-bromophenyl) sulfone, 34.2 parts of 1-amino-5-benzoylaminoanthraquinone, 14 parts of sodium carbonate, 2 parts of cupric acetate and 482 parts of nitrobenzene was heated at 200–210° C. for four hours. Then a mixture of 6 parts of sodium carbonate and 4 parts of 1-amino-5-benzoylaminoanthraquinone was added. The reaction was completed by heating at 200–210° C. for an additional hour. When cool, the reaction mixture was diluted with 240 parts of alcohol. The precipitated product was collected on a filter, washed with alcohol, acetone and water. The wet filter cake was stirred for one hour with dilute hydrochloric acid. The dyestuff

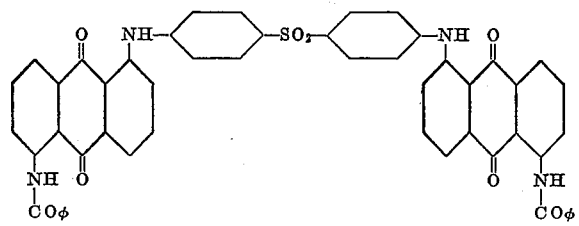

was collected on a filter, washed and dried. 38 parts (84.5%) of red-brown solid were obtained. From a deep red brown vat cotton is dyed in red brown shades of excellent fastness to chlorine, light and wash.

Carbazolation of 10 parts of this dyestuff resulted by heating at 185–195° C. for ten minutes in a melt of 80 parts of anhydrous aluminum chloride and 20 parts of sodium chloride. At 140–160° C., the reaction mixture was poured into ice-water containing hydrochloric acid.

The product was collected on a filter, washed, stirred at 85–95° C. with 2000 parts of water, and sodium hypochlorite solution was added in portions of 10 parts each until a positive test for chlorine is shown (starch-potassium iodide paper) after one hour from the time of the last addition. The purified product

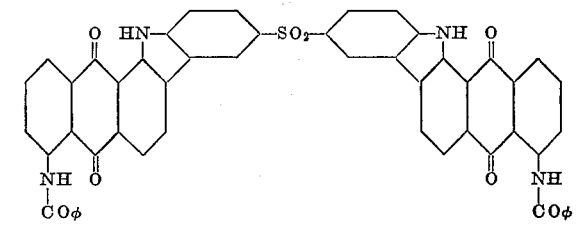

was collected on a filter, washed and dried. 6 parts of of yellow brown solid were obtained. This dyestuff dyes cotton in yellow brown shades of good fastness (light, 104 hours).

*Example II*

A mixture of 18.8 parts of bis(4-bromophenyl) sulfone, 36 parts of 1-amino-4-benzoylaminoanthraquinone, 15 parts of sodium carbonate, 2 parts of cupric acetate, and 711 parts of nitrobenzene was heated at 200–210° C. for six hours. On cooling, the precipitated product

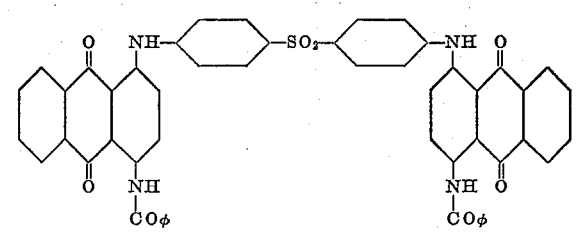

was collected on a filter, washed with dichlorobenzene, ethanol, acetone and water; 41 parts or 91.2% of theory of dyestuff being obtained. An aqueous paste was prepared by solution in concentrated sulfuric acid, pouring into ice, filtering, washing neutral and passing the wet filter cake through 200 mesh sieve. This dyestuff vats readily and dyes cotton in violet shades of good fastness properties.

*Example III*

A mixture of 9.4 parts of bis(4-bromophenyl) sulfone, 18 parts of 4-aminoanthraquinone-1,2-acridone, 7.5 parts of sodium carbonate, 1.5 parts of cupric acetate and 422 parts of nitrobenzene was heated at 200–210° C. for six hours. On cooling, the precipitated product

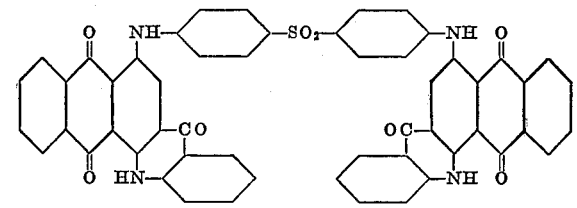

was collected on a filter, washed with dichlorobenzene, ethanol and acetone. 15 parts of green solid were obtained. It vats to give a dark green vat from which cotton is dyed in olive green shades of fair fastness properties.

*Example IV*

A mixture of 9.4 parts of bis(4-bromophenyl) sulfone, 8.5 parts of 1-amino-5-benzoylaminoanthraquinone, 8.5 parts of 1-amino-4-benzoylaminoanthraquinone, 6 parts of sodium carbonate, 2 parts of sodium acetate, 1 part of cupric acetate and 482 parts of nitrobenzene was heated in the usual manner for five hours and the product

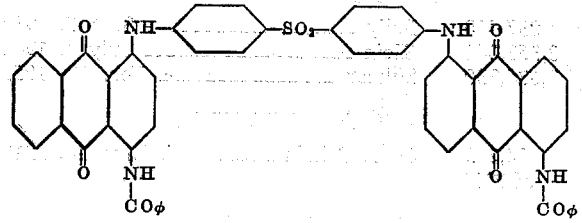

was isolated according to Example III. 15 parts of blue-violet solid were obtained. Cotton is dyed from a red brown vat of this compound in red-violet shades of good fastness properties.

Example V

A mixture of 18.8 parts of bis(4-bromophenyl) sulfone, 17 parts of 1-amino-5-benzoylaminoanthraquinone, 17 parts of 4-aminoanthraquinone 1,2-acridone, 15 parts of sodium carbonate, 3 parts of sodium acetate, 2 parts of cupric acetate, and 723 parts of nitrobenzene was treated in the usual manner, and gave 25 parts of product.

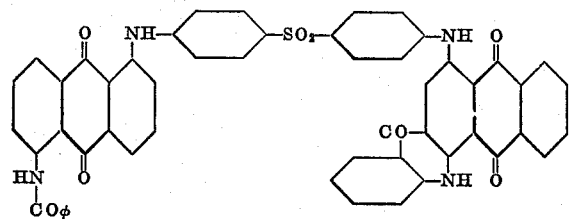

Example VI

Except for the use of 1-amino-4-benzoylaminoanthraquinone instead of 1-amino-5-benzoylaminoanthraquinone, the procedure employed here was identical to that employed in Example V. 35 parts of dull blue solid are obtained. The dyestuff

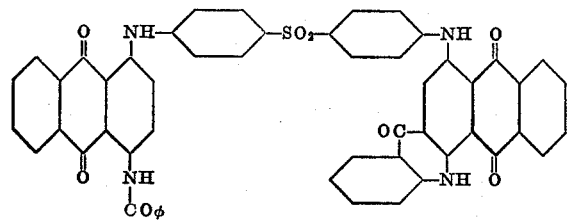

gives a purplish-brown vat from which cotton is dyed in blue-grey shades.

It is to be understood that the foregoing detailed description is merely given by way of illustration and that many variations may be made therein without departing from the spirit of our invention.

Having described our invention, what we desire to secure by Letters Patent is:

1. The vat dyestuff of the formula

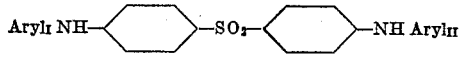

wherein $Aryl_I$ and $Aryl_{II}$ are anthraquinone radicals selected from the group consisting of unsubstituted anthraquinonyl, 3-benzamido-anthraquinonyl, 4-benzamido-anthraquinonyl, and 4-anthraquinone-2,1(N)-benzacridonyl.

2. The vat dyestuff of the formula

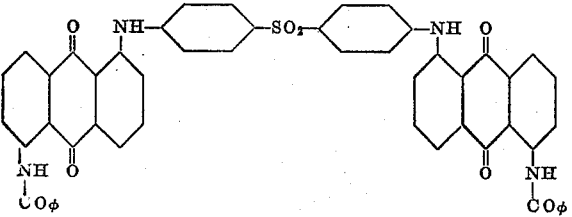

3. The vat dyestuff of the formula

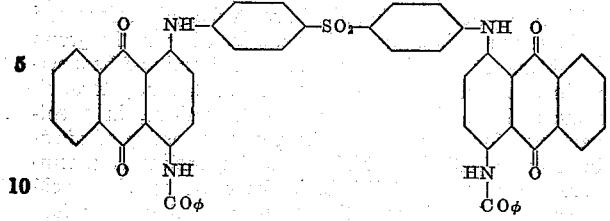

4. The vat dyestuff of the formula

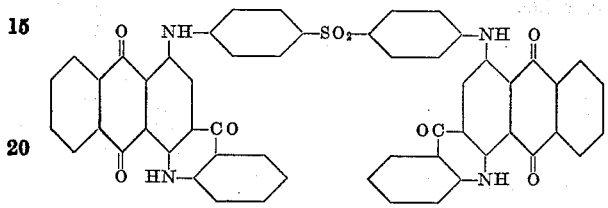

5. The vat dyestuff of the formula

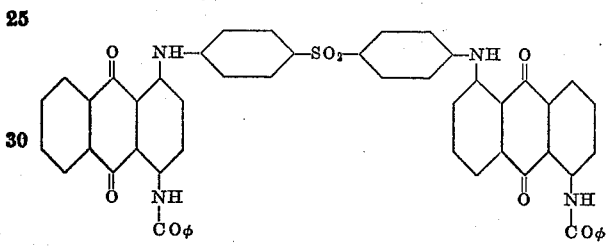

6. The vat dyestuff of the formula

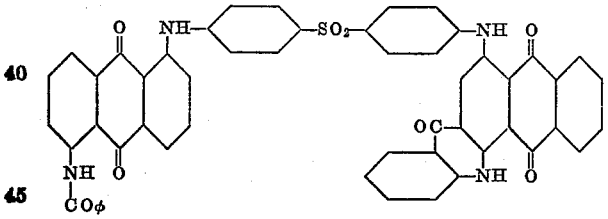

7. The vat dyestuff of the formula

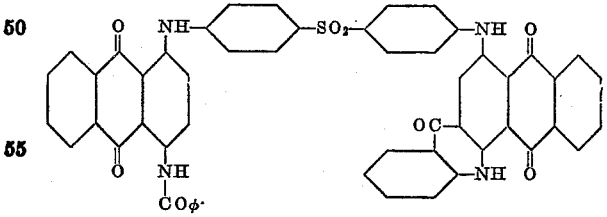

8. Process for the preparation of the dyestuffs of claim 1 which comprises reacting a di-substituted diphenyl sulfone with an amino anthraquinone in a solvent therefor at a temperature of 180 to 240° C. in the presence of an acid acceptor and a catalyst.

9. Process for the preparation of the dyestuffs of claim 1 which comprises reacting bis(4-bromophenyl) sulfone and 1-aminoanthraquinone in a solvent therefor at a temperature of 180 to 240° C.

10. Process for the preparation of vat dyestuffs of the formula

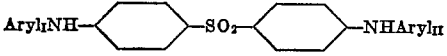

wherein $Aryl_I$ and $Aryl_{II}$ are anthraquinone radicals selected from the group consisting of unsubstituted anthraquinonyl, 3-benzamido-anthraquinonyl, 4-benzamido-anthraquinonyl, and 4-anthraquinone-2,1(N)-benzacridonyl which comprises reacting bis(4-bromophenyl) sulfone and at least one aminoanthraquinone, selected from the group consisting of 1-aminoanthraquinone, 1-amino-5-benzoylaminoanthraquinone, 1-amino-4-benzoylaminoanthraquinone and 4-aminoanthraquinone-1,2-acridone, in a solvent therefor selected from the group consisting of nitrobenzene, naphthalene, biphenyl and quinoline at a temperature of 180 to 240° C. in the presence of an acid acceptor, selected from the group consisting of sodium carbonate and sodium acetate, and a catalyst selected from the group consisting of cupric acetate and cuprous chloride.

References Cited in the file of this patent

UNITED STATES PATENTS

| | | |
|---|---|---|
| 1,037,410 | Bally | Sept. 3, 1912 |
| 2,353,041 | Klein | July 4, 1944 |
| 2,628,230 | Stilmar | Feb. 10, 1953 |

FOREIGN PATENTS

| | | |
|---|---|---|
| 14,225 of 1911 | Great Britain | Mar. 14, 1912 |

OTHER REFERENCES

Lubs: The Chemistry of Synthetic Dye and Pigments, Reinhold Pub. Corp., New York (1955), pp. 440–441.